United States Patent
Han et al.

(10) Patent No.: US 9,572,066 B2
(45) Date of Patent: Feb. 14, 2017

(54) APPARATUS AND METHOD FOR ACCESS POINT SELECTION

(71) Applicant: INDUSTRY-ACADEMIC COOPERATION FOUNDATION, YONSEI UNIVERSITY, Seoul (KR)

(72) Inventors: Seung Jae Han, Seoul (KR); Jung Han Han, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 73 days.

(21) Appl. No.: 14/584,126

(22) Filed: Dec. 29, 2014

(65) Prior Publication Data

US 2015/0189538 A1 Jul. 2, 2015

(30) Foreign Application Priority Data

Dec. 30, 2013 (KR) ........................ 10-2013-0166917

(51) Int. Cl.
*H04W 28/02* (2009.01)
*H04W 48/20* (2009.01)

(52) U.S. Cl.
CPC ......... *H04W 28/0236* (2013.01); *H04W 48/20* (2013.01)

(58) Field of Classification Search
CPC .. H04W 28/0236; H04W 24/08; H04W 48/20; H04W 36/08; H04W 48/00; H04W 28/044; H04W 28/046; H04W 40/125
See application file for complete search history.

(56) References Cited

U.S. PATENT DOCUMENTS

| | | | | |
|---|---|---|---|---|
| 2005/0271021 A1* | 12/2005 | Alemany | ............... | H04W 48/20 370/338 |
| 2007/0054645 A1* | 3/2007 | Pan | ........................ | H04W 24/08 455/266 |
| 2009/0265599 A1* | 10/2009 | Chae | ...................... | H04L 1/1812 714/749 |
| 2014/0056250 A1* | 2/2014 | Cattoni | ................. | H04W 72/08 370/329 |
| 2014/0241268 A1* | 8/2014 | Zhu | ........................ | H04W 74/04 370/329 |
| 2015/0189538 A1* | 7/2015 | Han | ....................... | H04W 48/20 370/230 |

FOREIGN PATENT DOCUMENTS

| KR | 1020100118612 A | 11/2010 |
|---|---|---|
| KR | 1020130016401 A | 2/2013 |

* cited by examiner

*Primary Examiner* — Benjamin H Elliott, IV
(74) *Attorney, Agent, or Firm* — Ladas & Parry LLP

(57) ABSTRACT

An apparatus for access point selection are disclosed. The disclosed access point selection apparatus includes: a sniffing unit configured to sniff packets transmitted to each of a multiple number of access points during a preset duration of time; a calculation unit configured to calculate a retransmission rate for each of the access points, calculate a collision probability of packets transmitted to each of the access points and a number of terminals transmitting packets to each of the access points by using the retransmission rate, and calculate an uplink packet processing rate of each of the access points by using the collision probability and the number of terminals transmitting packets; and a selection unit configured to select the access point having the highest value of the uplink packet processing rate from among the access points as the access point to which a target terminal is to be wirelessly connected.

6 Claims, 5 Drawing Sheets

APPARATUS AND METHOD FOR ACCESS POINT SELECTION

CROSS-REFERENCE TO RELATED APPLICATIONS

This application claims the benefit of Korean Patent Application No. 10-2013-0166917, filed with the Korean Intellectual Property Office on Dec. 30, 2013, the disclosure of which is incorporated herein by reference in its entirety.

BACKGROUND

1. Technical Field

The embodiments of the present invention relate to an apparatus and a method for access point selection, more particularly to an access point selection apparatus and method that can increase the utilization of wireless resources in a wireless network environment that has a relative high density of mobile users.

2. Description of the Related Art

Recent times have seen significant advances in wireless network technology, as well as rapid increases in market demand for related services. Accordingly, there has been much growth in the use of the wireless Internet based on various wireless devices such as smart phones, laptop computers, PDA's (personal digital assistants), etc.

A wireless LAN terminal refers to a user terminal that connects to a WiFi access point (AP) in a wireless LAN based on IEEE 802.11 to enable use of the wireless Internet. Here, the matter of which access point is selected by a wireless LAN terminal is of great importance, as it is a factor that determines the quality of the wireless network.

According to the related art, when a wireless LAN terminal selects an access point for connecting to a wireless network, the wireless LAN terminal may transmit a scan request signal and receive scan response signals from surrounding access points that respond to the scan request signal. A wireless LAN terminal may identify the scan response signal having the highest signal strength (based on the received signal strength indicator (RSSI)) from among the scan response signals received, and may select the access point that transmitted this scan response signal.

That is, in wireless communication, when there are more than one AP's, a terminal may communicate with the AP having the highest data rate, but according to the related art, the AP may be selected based only on signal strength, so that the problem of congestion may occur as many terminals concentrate on one AR.

In other words, whereas the typical method available is to connect to a particular access point based on the RSSI, measure the packet throughput, and disengage the connection if the packet throughput is too low, this may degrade the performance of the application running on the terminal (for example, with service disruption during handovers) and may exacerbate the congestion at the access point (for example, because unnecessary traffic is caused by connecting to a particular access point for a speed test).

SUMMARY

To resolve the problems in the related art described above, an aspect of the invention aims to provide an apparatus and a method for access point selection that can increase the utilization of wireless resources in a wireless network environment that has a relative high density of mobile users.

To achieve the objective above, an embodiment of the invention provides an access point selection apparatus that includes: a sniffing unit configured to sniff packets transmitted to each of a multiple number of access points during a preset duration of time; a calculation unit configured to calculate a retransmission rate for each of the access points, where the retransmission rate represents a ratio between packets that were retransmitted and packets that were not retransmitted from among the sniffed packets, calculate a collision probability of packets transmitted to each of the access points and a number of terminals transmitting packets to each of the access points by using the retransmission rate, and calculate an uplink packet processing rate of each of the access points by using the collision probability and the number of terminals transmitting packets; and a selection unit configured to select the access point having the highest value of the uplink packet processing rate from among the access points as the access point to which a target terminal is to be wirelessly connected.

The retransmission rate can be expressed as the equation shown below:

$$r = \sum_{i=0}^{l} \left(\frac{n_r}{n_r + n_d}\right)^{i+1}$$

where r is the retransmission rate, i is the number of consecutive retransmission failures, l is the limit on the number of retransmissions, $n_r$ is the number of retransmitted packets, and $n_d$ is the total number of sniffed packets.

Calculating the collision probability of packets can be performed by way of graph matching on a predetermined graph plotting retransmission rates to collision probability, and calculating the number of terminals transmitting packets can be performed by way of graph matching on a predetermined graph plotting retransmission rates to numbers of terminals transmitting packets.

The uplink packet processing rate can be expressed as the equation shown below:

$$\theta_u = \frac{S \times b}{n_s + 1}$$

where $$S = \frac{2(1-p_c)}{2-p_c} \times \frac{T_{payload}}{T_{physical} + T_{SIFS} + T_{ACK} + T_{DIFS} + \frac{W}{n_s + 1}T_{slot}}$$

and where $\theta_u$ is the uplink packet processing rate, b is the transmission bit rate of the target terminal connected to the access point, $n_s$ is the number of terminals transmitting packets, $P_C$ is the collision probability, $T_{payload}$ is the average time required for transmitting a payload, $T_{physical}$ is the time required for transmitting a packet including a header, $T_{ACK}$ is the time required for transmitting an acknowledgement, $T_{SIFS}$, $T_{DIFS}$, and $T_{slot}$ are predetermined time coefficients, and W is the minimum competitive window size.

Another embodiment of the invention provides an access point selection method that includes: sniffing packets transmitted to each of a multiple number of access points during a preset duration of time; calculating a retransmission rate for each of the access points, where the retransmission rate represents a ratio between packets that were retransmitted and packets that were not retransmitted from among the sniffed packets; calculating a collision probability of packets transmitted to each of the access points and the number of terminals transmitting packets to each of the access points by using the retransmission rate; calculating an uplink packet processing rate of each of the access points by using the collision probability and the number of terminals transmitting packets; and selecting the access point having the highest value of the uplink packet processing rate from among the access points as the access point to which the target terminal is to be wirelessly connected.

An embodiment of the invention can increase the utilization of wireless resources in a wireless network environment that has a relative high density of mobile users.

Additional aspects and advantages of the present invention will be set forth in part in the description which follows, and in part will be obvious from the description, or may be learned by practice of the invention.

DETAILED DESCRIPTION

Figure 1:
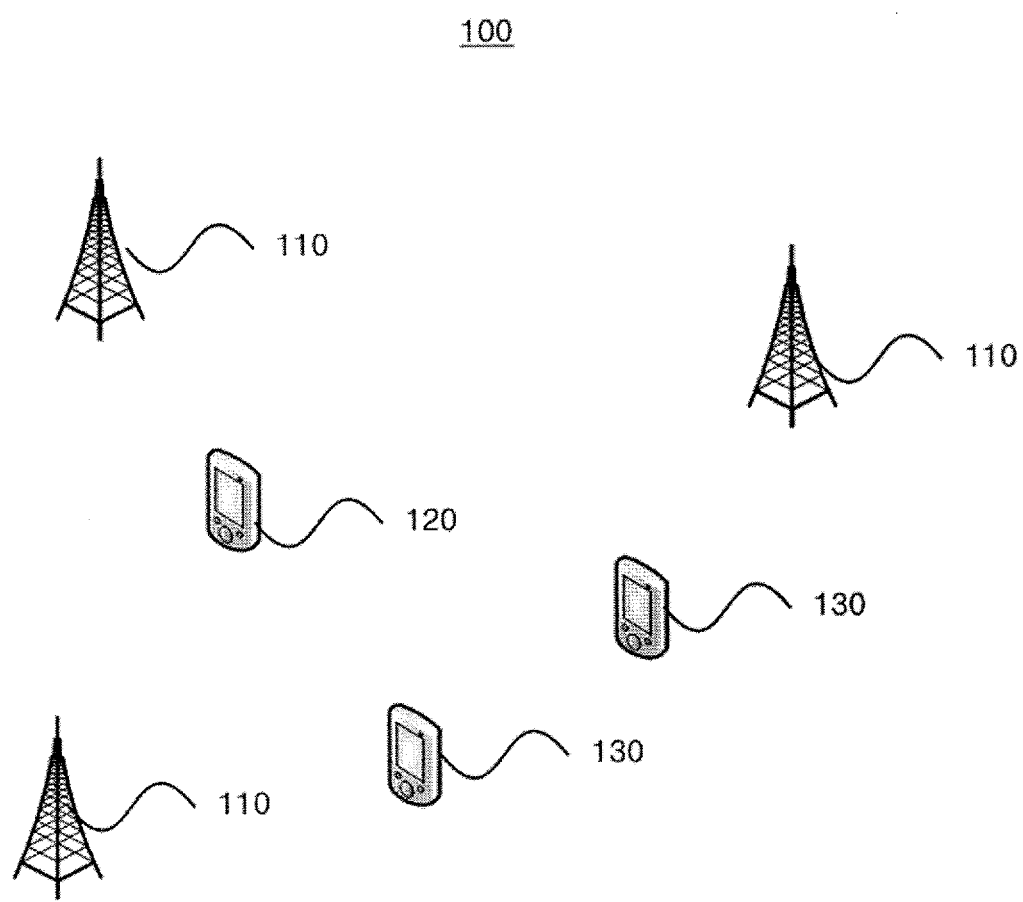
FIG. 1 schematically illustrates the composition of a wireless network system according to an embodiment of the invention.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

Certain embodiments of the invention are described below in more detail with reference to the accompanying drawings.

FIG. 1 schematically illustrates the composition of a wireless network system according to an embodiment of the invention.

Referring to FIG. 1, a wireless network system 100 according to an embodiment of the invention may include a multiple number of access points 110 (hereinafter referred to as "AP"), a first terminal 120, and a multiple number of second terminals 130.

The first terminal 120, the first of the terminals to select an AP, may select the AP to which it will wirelessly connect from among the multiple AP's 110. Here, the first terminal 120 may select the AP, to which it will wirelessly connect, by using the uplink packet processing rates (throughput) of the AP's 110, rather than using the RSSI (received signal strength indicator) of the AP's 110.

Figure 2:
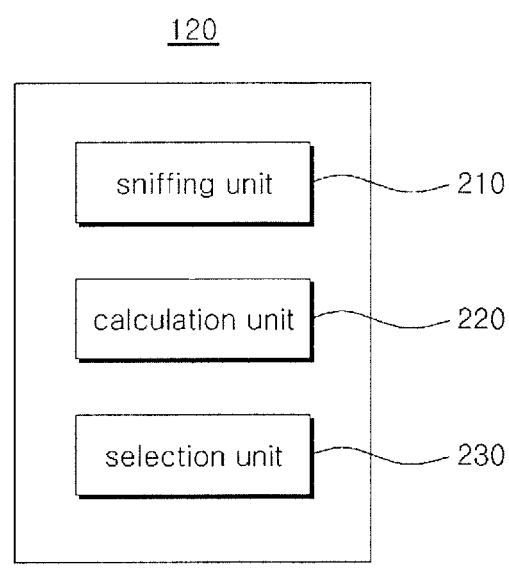
FIG. 2 schematically illustrates the composition of an access point selection apparatus included in the target terminal of a wireless network system according to an embodiment of the invention.

FIG. 2 schematically illustrates the composition of an access point selection apparatus 200 included in the first terminal 120 above.

Referring to FIG. 2, an access point selection apparatus 200 according to an embodiment of the invention may include a sniffing unit 210, a calculation unit 220, and a selection unit 230. The functions of each component are described below in more detail.

The sniffing unit 210 may sniff the packets that are transmitted to the multiple AP's 110. That is, the sniffing unit 210 may sniff a multiple number of packets that are transmitted from the second terminals 130, i.e. other terminals within the system 100, and received at each access point. In other words, the sniffing unit 210 may collect or monitor the packets transmitted by air for each of the AP 110.

According to an embodiment of the invention, the sniffing unit 210 can perform the sniffing by using the IEEE 802.11 interface "Monitor mode". That is, in monitor mode, the sniffing unit 210 can overhear the transmissions of IEEE 802.11 packets sent over the air, even if the destinations of the packets are not the first terminal 120.

The calculation unit 220 may calculate the 'retransmission rate', 'collision probability of the packets', and 'number of terminals transmitting packets', which may serve as criteria for selecting the access point to which to wirelessly connect from among the multiple AP's 110.

In other words, the calculation unit 220 may calculate the retransmission rates, the collision probability of the packets, the number of packet-transmitting terminals, and the uplink packet processing rate for each of the access points. For any one AP, the calculation unit 220 may calculate the 'retransmission rate', which represents the ratio of packets that were retransmitted and packets that were not retransmitted from among the sniffed packets, use the retransmission rate to calculate the 'collision probability of packets' transmitted to an AP and the number of second terminals 130 transmitting packets to an AP, and use the collision probability and the number of packet-transmitting terminals to calculate the 'uplink packet processing rate' of an AP.

Looking at this in more detail, first, the calculation unit 220 may calculate the retransmission rate for each AP. That is, when the transmission of a packet is successful at the transmitting end (i.e. the decoding of the packet is successful at the receiving end), the receiving end may transmit an acknowledgement to the transmitting end, but if the transmission fails due to a collision or corruption, there is no acknowledgement generated and the transmitter may retransmit the packet. Thus, the calculation unit 220 may calculate the 'retransmission rate', which represents the ratio between packets that were retransmitted and packets that were not retransmitted from among the sniffed packets, for each of the AP's. Here, the information on whether or not a packet is being 'retransmitted' may be indicated in the MAC header of the header.

According to an embodiment of the invention, the retransmission probability for each AP can be expressed as Equation 1 shown below.

$$r = \sum_{i=0}^{l} \left(\frac{n_r}{n_r + n_d}\right)^{i+1} \qquad \text{[Equation 1]}$$

Here, r represents the retransmission rate, i represents the number of consecutive retransmission failures, l represents the limit on the number of retransmissions as defined by IEEE 802.11, $n_r$ represents the number of retransmitted packets, and $n_d$ represents the total number of sniffed packets.

Figure 3A:
FIG. 3A, FIG. 3B, and FIG. 3C are to illustrate the concept of the retransmission rate according to an embodiment of the invention.
Figure 3B:
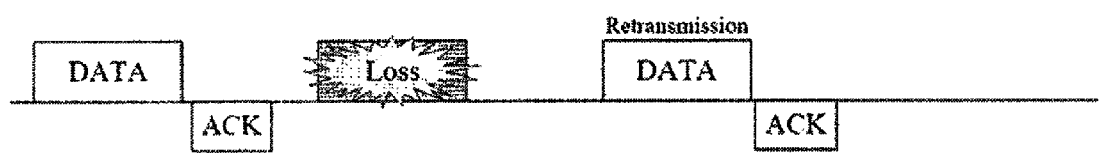
Figure 3C:
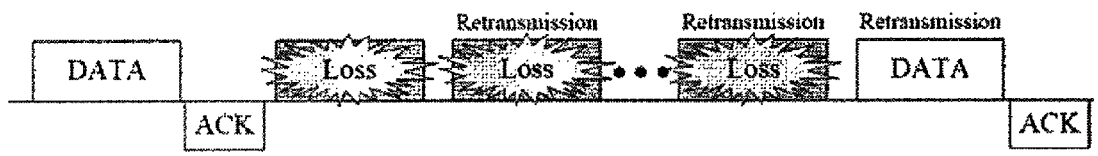

In relation to this, FIGS. 3A to 3C illustrate the possible cases of i) a packet transmission succeeding without a retransmission (FIG. 3A), ii) a packet transmission succeeding with one retransmission (FIG. 3B), and iii) a packet transmission succeeding after several consecutive retransmissions (FIG. 3C). FIG. 3C may aid the understanding of the "number of consecutive retransmission failures (i)".

Next, the calculation unit 220 may use the retransmission rate to calculate the collision probability of packets transmitted to each AP and the number of terminals transmitting packets to each AP, i.e. the number of active terminals.

According to an embodiment of the invention, calculating the collision probability of packets can be performed by graph matching on a predetermined graph that plots the retransmission rate in relation to packet collision probability. Also, according to an embodiment of the invention, calculating the number of terminals transmitting packets to each AP can be performed by graph matching on a predetermined graph that plots the retransmission rate in relation to the number of packet-transmitting terminals.

Figure 4:
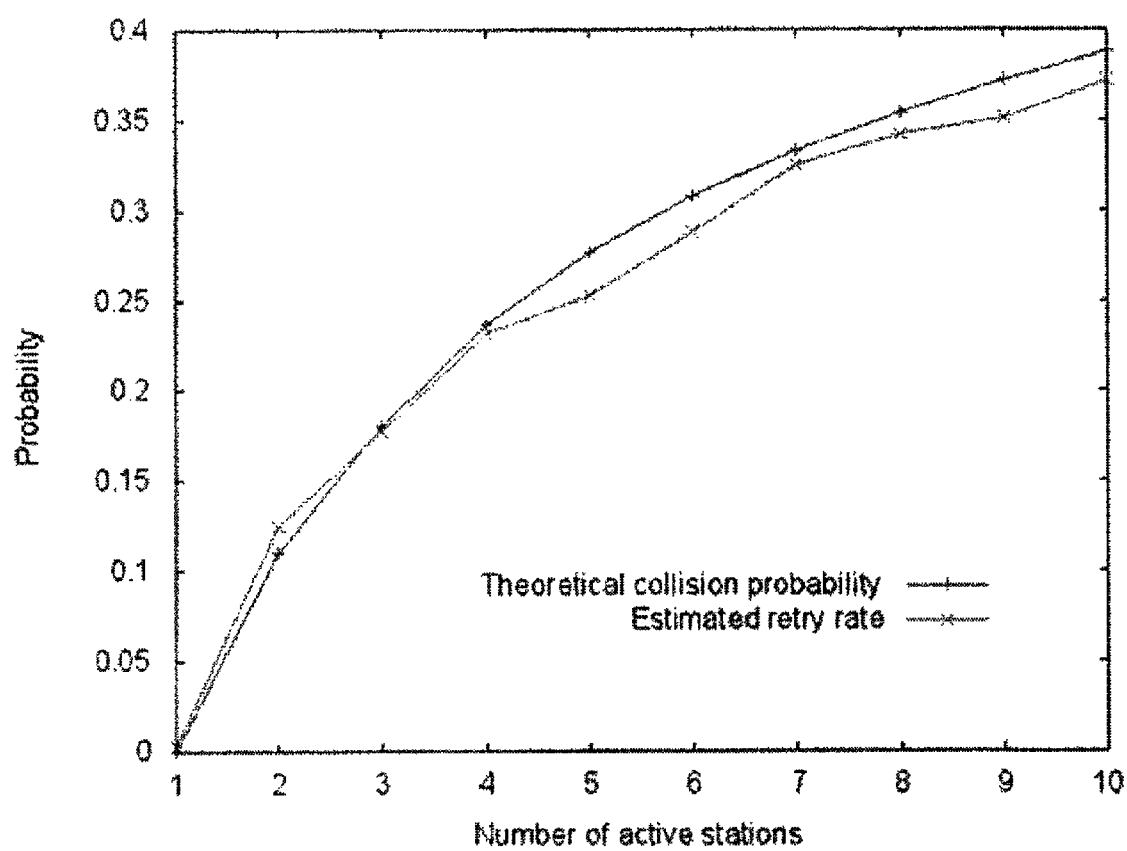
FIG. 4 illustrates an example of the result of graph matching for the retransmission rate, the packet collision probability, and the number of terminals transmitting packets to the AP, according to an embodiment of the invention.

FIG. 4 illustrates an example of the result of graph matching for the retransmission rate, the packet collision probability, and the number of terminals transmitting packets to the AP, according to an embodiment of the invention. Referring to FIG. 4, the 'retransmission rate (retry rate)' shown as a curve marked with "×" can be used to calculate the 'number of terminals transmitting packets to an AP' on the X axis and the 'collision probability' shown on the Y axis and the curve marked with "+".

Referring to FIG. 4, it can be observed that the retransmission rate and the packet collision probability and the number of terminals transmitting packets to the AP are similar to one another, and in order to simplify the calculation results, the calculation unit 220 can use the same value for the retransmission rate, packet collision probability, and number of terminals transmitting packets to the AP.

Continuing with the description, the calculation unit 220 may use the collision probability and the number of packet-transmitting terminals to calculate the uplink packet processing rate of each of the access points. The uplink packet processing rate represents the uplink throughput, which indicates the capability of processing packets at each AP.

More specifically, the calculation unit 220 may first calculate the 'channel bandwidth rate' which is used for successfully transmitting a payload and which may be expressed as Equation 2 below.

$$S = \frac{2(1-p_c)}{2-p_c} \times \frac{T_{payload}}{T_{physical} + T_{SIFS} + T_{ACK} + T_{DIFS} + \frac{W}{n_s+1}T_{slot}}$$ [Equation 2]

Here, S represents the channel bandwidth rate, $P_C$ represents the collision probability, $n_s$ represents the number of terminals transmitting packets to the AP, $T_{payload}$ represents the average time for transmitting a payload, $T_{physical}$ represents the time for transmitting a packet including a header, $T_{ACK}$ represents the time for transmitting an acknowledgement, $T_{SIFS}$, $T_{DIFS}$, and $T_{slot}$ are predetermined constants ($T_{SIFS}$ is 10 microseconds, $T_{DIFS}$ is 50 microseconds, $T_{slot}$ is 50 microseconds), W represents the minimum competitive window size, and '$W/n_s+$' represents the average backoff interval between transmissions when all of the second terminals 130 have backlog traffic, as defined by IEEE 802.11.

Also, the calculation unit 220 may use the channel bandwidth rate to calculate the uplink packet processing rate, as expressed by Equation 3 shown below.

$$\theta_u = \frac{S \times b}{n_s + 1}$$ [Equation 3]

Here, $\theta_u$ represents the uplink packet processing rate, and b represents the transmission bit rate of the first terminal 120 connected to the AP.

In summary, the calculation unit 220 can calculate the uplink packet processing amount by using Equation 4 shown below.

$$\theta_u = \frac{S \times b}{n_s + 1}$$ [Equation 4]

where $$S = \frac{2(1-p_c)}{2-p_c} \times \frac{T_{payload}}{T_{physical} + T_{SIFS} + T_{ACK} + T_{DIFS} + \frac{W}{n_s+1}T_{slot}}$$

Lastly, the selection unit 230 may select the AP having the highest value from among the uplink packet processing rate of each AP as the AP to which the first terminal 120 is to be wirelessly connected.

Thus, by using the uplink packet processing rates of the AP's instead of the RSSI when selecting an AP, an access point selection apparatus 200 according to an embodiment of the invention can increase the performance of the application running on the first terminal 120, alleviate the congestion at the access points, and increase the utilization of wireless resources in a wireless network environment in which the density of mobile users is relatively high.

According to another embodiment of the invention, the access point selection apparatus 200 can calculate the downlink packet processing rate of each AP and use this in selecting the AP to which the first terminal 120 is to wirelessly connect. A more detailed description is provided below.

In the case of a downlink, the AP is the transmitter, and the first terminal 120 and the multiple second terminals 130 are the receivers, with the AP competing with other uplink AP's. Thus, the downlink packet processing rate available for a new AP may be estimated.

First, the access point selection apparatus 200 may differentiate the uplink packet stream from the downlink packet stream. This can be obtained by comparing the MAC addresses of the source and destination of a frame. The MAC address of the AP can be obtained from a beacon, and the downlink packet processing rate of each downlink AP can be calculated as in Equation 5 shown below.

$$\theta_{di} = \frac{d}{t_m}$$ [Equation 5]

Here, $\theta_{di}$ represents the downlink packet processing amount of an AP, and d represents the accumulated data sum for an AP during $t_m$.

Next, the access point selection apparatus 200 may calculate the number of active downlink AP's. According to an embodiment of the invention, the access point selection apparatus 200 can estimate the number of active downlink AP's by dividing the total downlink packet processing amount by the largest downlink packet processing amount from among all of the AP's. This can be expressed as Equation 6.

$$n_{ds} = \frac{\theta_{AP}}{\max[\theta_{di}]} \quad \text{[Equation 6]}$$

Here, $n_{ds}$ represents the number of active downlink AP's, and $\theta_{AP}$ represents the total downlink packet processing amount.

Lastly, the access point selection apparatus 200 may calculate the downlink packet processing amount $\theta_d$ based on Equation 7 shown below.

$$\theta_d = \frac{\theta_{AP}}{n_{ds} + 1} \quad \text{[Equation 7]}$$

Figure 5:
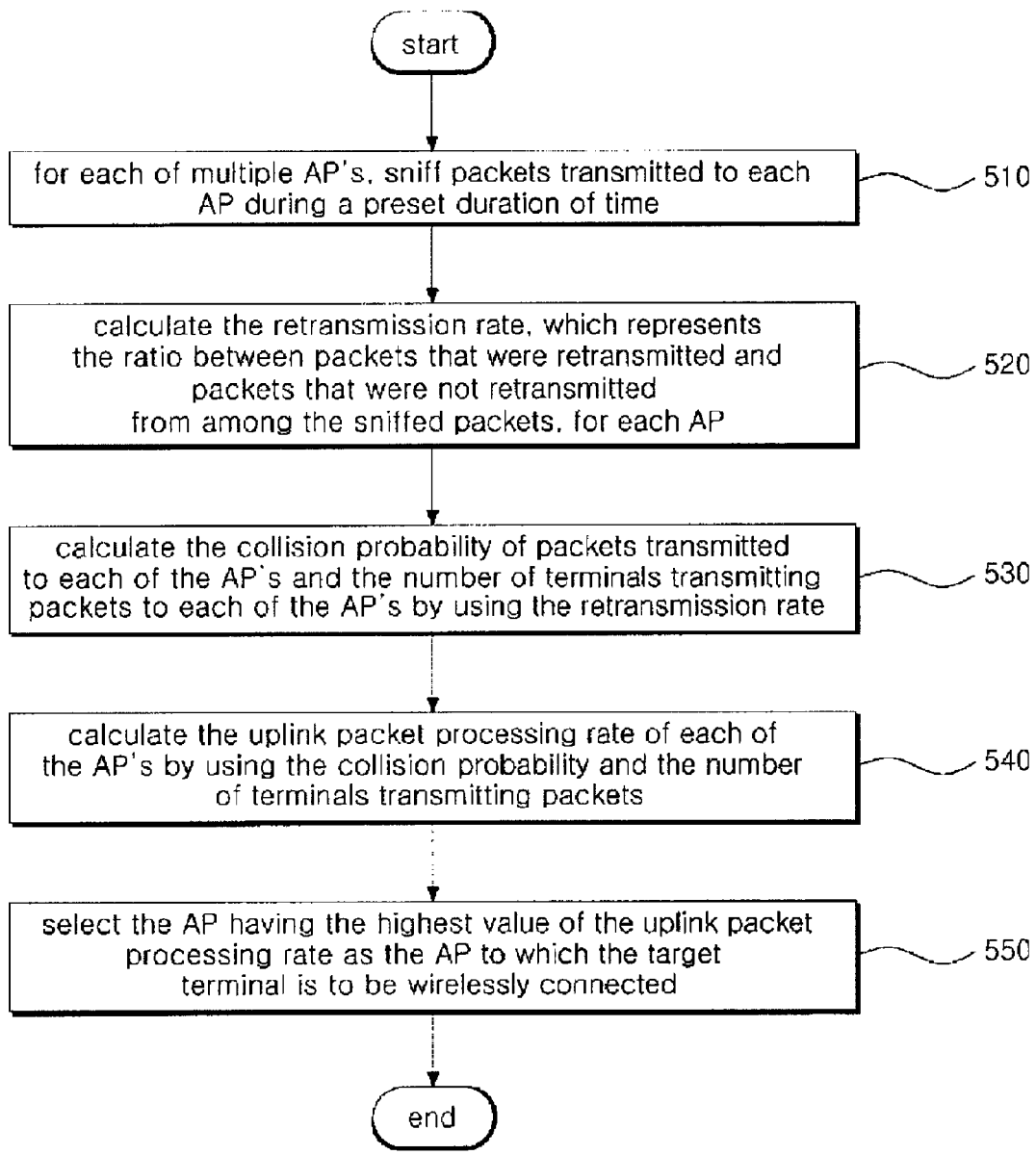
FIG. 5 is a flowchart illustrating an access point selection method according to an embodiment of the invention.

FIG. 5 is a flowchart illustrating an access point selection method according to an embodiment of the invention. The procedures performed in each operation are described below in more detail.

First, in operation 510, the multiple numbers of packets transmitted to each AP during a preset amount of time may be sniffed for each of a multiple number of AP's. That is, in operation 510, the packets transmitted by air may be collected or monitored for each AP.

Next, in operation 520, the retransmission rate, which represents a ratio between packets that were retransmitted and packets that were not retransmitted from among the sniffed packets, may be calculated for each of the AP's, and in operation 530, the collision probability of packets transmitted to each AP and the number of terminals transmitting packets to each AP may be calculated by using the retransmission rate. In operation 540, the uplink packet processing rate of each AP may be calculated by using the collision probability and the number of packet-transmitting terminals.

Lastly, in operation 550, the AP having the largest value from among the uplink packet processing rates of the AP's may be selected as the AP to which the target terminal is to be wirelessly connected.

The above describes an AP selection method according to certain embodiments of the invention. The features related to the AP selection apparatus 200 described with reference to FIG. 1 through FIG. 4 can also be applied to the present embodiment. As such, redundant details are omitted.

The technical features described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. An access point selection apparatus connected to a terminal comprising:
    a sniffing unit configured to sniff a plurality of packets transmitted to each of a plurality of access points during a preset duration of time;
    a calculation unit configured to calculate a retransmission rate for each of the access points, the retransmission rate representing a ratio between packets that were retransmitted and packets that were not retransmitted from among the sniffed packets, the calculation unit configured to calculate a collision probability of packets transmitted to each of the access points and a number of terminals transmitting packets to each of the access points by using the retransmission rate, the calculation unit configured to calculate an uplink packet processing rate of each of the access points by using the collision probability and the number of terminals transmitting packets; and
    a selection unit configured to select an access point having a highest value of the uplink packet processing rate from among the access points as an access point to which a target terminal is to be wirelessly connected.

2. The access point selection apparatus of claim 1, wherein the retransmission rate is expressed as an equation shown below:

$$r = \sum_{i=0}^{l} \left(\frac{n_r}{n_r + n_d}\right)^{i+1}$$

where r is the retransmission rate, i is a number of consecutive retransmission failures, l is a limit on a number of retransmissions, $n_r$ is a number of retransmitted packets, and $n_d$ is a total number of the sniffed packets.

3. The access point selection apparatus of claim 1, wherein calculating the collision probability of packets is performed by way of graph matching on a predetermined graph plotting retransmission rates to collision probability, and calculating the number of terminals transmitting packets is performed by way of graph matching on a predetermined graph plotting retransmission rates to numbers of terminals transmitting packets.

4. The access point selection apparatus of claim 1, wherein the uplink packet processing rate is expressed as an equation shown below:

$$\theta_u = \frac{S \times b}{n_s + 1}$$

where $$S = \frac{2(1 - p_c)}{2 - p_c} \times \frac{T_{payload}}{T_{physical} + T_{SIFS} + T_{ACK} + T_{DIFS} + \frac{W}{n_s + 1} T_{slot}}$$

and where $\theta_u$ is the uplink packet processing rate, b is a transmission bit rate of the target terminal connected to the access point, $n_s$ is the number of terminals transmitting packets, $P_C$ is the collision probability, $T_{payload}$ is an average time required for transmitting a payload, $T_{physical}$ is a time required for transmitting a packet including a header, $T_{ACK}$ is a time required for transmitting an acknowledgement, $T_{SIFS}$, $T_{DIFS}$, and $T_{slot}$ are predetermined time coefficients, and W is a minimum competitive window size.

5. An access point selection method used by a first terminal among a plurality of terminals comprising:
sniffing, by the first terminal, a plurality of packets transmitted to each of a plurality of access points during a preset duration of time;
calculating, by the first terminal, a retransmission rate for each of the access points, the retransmission rate representing a ratio between packets that were retransmitted and packets that were not retransmitted from among the sniffed packets;
calculating, by the first terminal, a collision probability of packets transmitted to each of the access points and a number of terminals transmitting packets to each of the access points by using the retransmission rate;
calculating, by the first terminal, an uplink packet processing rate of each of the access points by using the collision probability and the number of terminals transmitting packets; and
selecting, by the first terminal, an access point having a highest value of the uplink packet processing rate from among the access points as an access point to which a target terminal is to be wirelessly connected.

6. An improved access point selection method comprising:
providing a terminal to connect to an access point among a plurality of access points, wherein the terminal performs the steps of:
sniffing a plurality of packets transmitted to each of the plurality of access points during a preset duration of time;
calculating a retransmission rate for each of the access points, the retransmission rate representing a ratio between packets that were retransmitted and packets that were not retransmitted from among the sniffed packets;
calculating a collision probability of packets transmitted to each of the access points and a number of terminals transmitting packets to each of the access points by using the retransmission rate;
calculating an uplink packet processing rate of each of the access points by using the collision probability and the number of terminals transmitting packets; and
selecting an access point having a highest value of the uplink packet processing rate from among the access points as an access point to which a target terminal is to be wirelessly connected,
wherein the retransmission rate is expressed as an equation shown below:

$$r = \sum_{i=0}^{l} \left(\frac{n_r}{n_r + n_d}\right)^{i+1}$$

where r is the retransmission rate, i is a number of consecutive retransmission failures, l is a limit on a number of retransmissions, $n_r$ is a number of retransmitted packets, and $n_d$ is a total number of the sniffed packets.

* * * * *